United States Patent [19]
Cunningham

[11] 3,795,982
[45] Mar. 12, 1974

[54] INDEX TAB POSITION LAYOUT

[75] Inventor: Walter F. Cunningham, Des Plaines, Ill.

[73] Assignee: Superior Tabbies, Incorporated, Elk Grove, Village, Ill.

[22] Filed: Jan. 31, 1972

[21] Appl. No.: 221,989

[52] U.S. Cl............ 33/111, 156/269, 206/56 AB, 33/180 R
[51] Int. Cl........ B43l 7/00, B42f 21/04, G01b 3/02
[58] Field of Search............ 283/37, 38, 42; 161/39, 161/167, 145; 206/56 AB; 33/107 R, 111, 174 G, 189, 192, 180 R; 156/1 R, 269

[56] References Cited
UNITED STATES PATENTS

| | | | |
|---|---|---|---|
| 3,070,482 | 12/1962 | Cunningham | 156/269 |
| 2,522,908 | 9/1950 | Szabo | 33/107 R |
| 2,679,928 | 6/1954 | Bishop et al. | 206/56 AB |
| 2,883,044 | 4/1959 | Kendrick | 206/56 AB |
| 2,932,897 | 4/1960 | Huber | 206/56 AB |
| 1,396,806 | 11/1921 | Beals | 33/189 |
| 170,959 | 12/1875 | Lovell | 33/174 G |
| 2,893,144 | 7/1959 | Cunningham | 206/56 AB |
| 1,875,410 | 9/1932 | Babcock | 33/180 R |

Primary Examiner—John W. Huckert
Assistant Examiner—Jon W. Henry
Attorney, Agent, or Firm—Lawrence W. Brugman

[57] ABSTRACT

Index tab position layout to insure accurate manual placement of a set of precut index tabs in a uniformly spaced arrangement on the marginal edges of selected sheets of a volume in both directions from its transverse center line, comprising marginal scales on the reverse side of a release paper backing for the set of index tabs for use with different lengths of tab-receiving sheets and which are selectively useable according to the particular length of sheet involved to make a separate position layout on a strip of the same length as the tab-receiving edges of the sheets, and the method of making such separate position layout and using it for mounting the set of index tabs.

7 Claims, 4 Drawing Figures

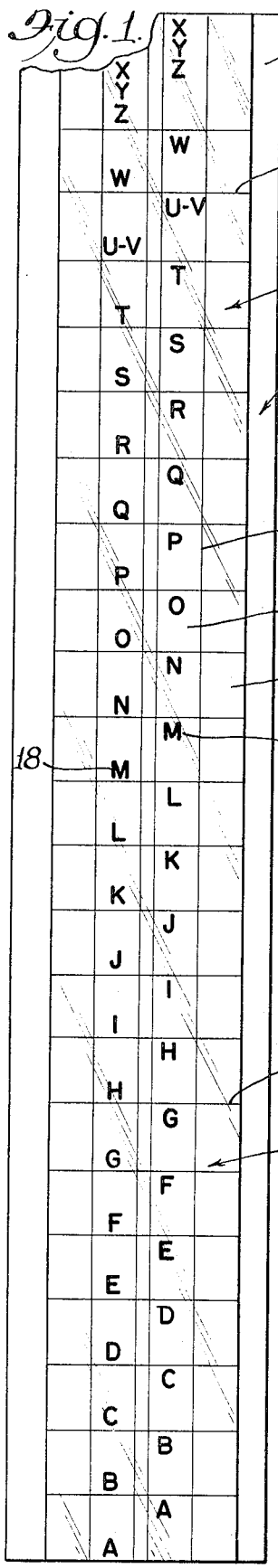
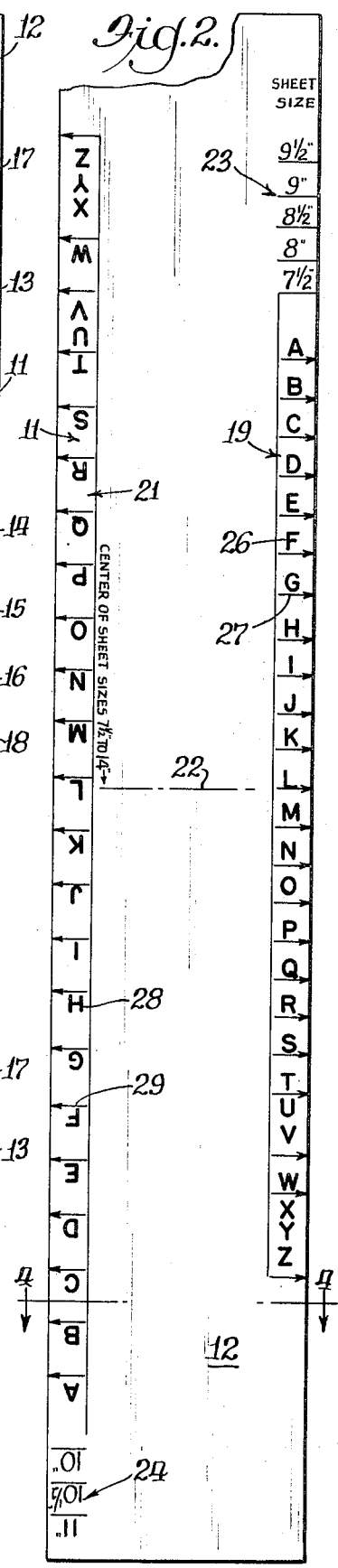
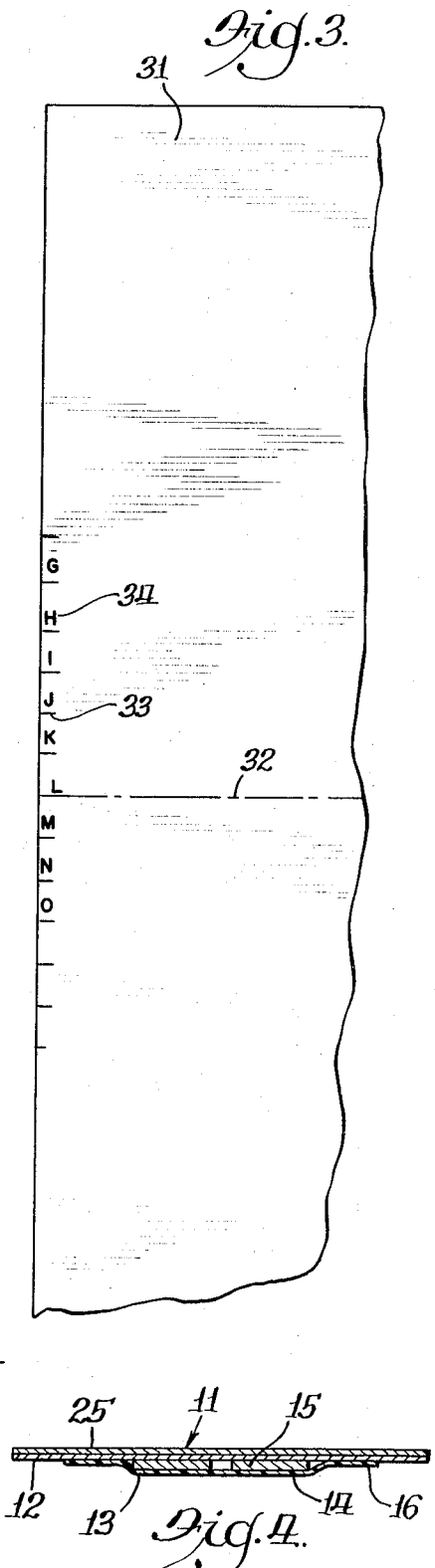
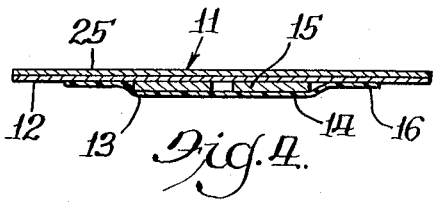

INDEX TAB POSITION LAYOUT

BACKGROUND OF THE INVENTION

1. Field of the Invention

The invention relates generally to index tabs, and more particularly to novel means and method for facilitating manual placement of a set of index tabs in uniformly spaced relationship on selected sheets of a volume.

2. Description of the Prior Art

Manual placement of a set of index tabs results either in uneven spacing and an unsightly index or requires extreme care and time-consuming effort. Where a precut set of tabs is employed, it is necessary in order to obtain a neat and uniformly spaced index to measure the length of the tab-receiving volume sheets, as by means of a ruler, divide the same by the number of tabs in the set, and successively apply the tabs to the proper sheets spaced from each other by the resulting quotient. Even with an alphabetical set of precut index tabs having mounting skirt portions with pressure-sensitive adhesive on their lower surfaces and temporarily mounted on a carrier strip of release paper, such as shown in FIG. 10 of my prior U. S. letters Pat. No. 3,070,482, these same problems obtain. In the modification of FIGS. 1–3 of that patent, a scale 29 is shown as being inscribed on the under or reverse surface of the carrier strip 28, but this is provided solely to facilitate manual cutting of the portions defined by the transverse severance lines 31 into separate tabs of desired widths.

SUMMARY OF THE INVENTION

The primary object of this invention is to facilitate manual placement of a set of precut index tabs on selected sheets of a volume so that adjacent tabs will be uniformly spaced from each other. To this end, novel scale means are provided on the reverse side of a release paper backing for a precut set of index tabs which are specifically related to that particular set of index tabs and indicate the exact positions in each direction from the transverse center of the tab-receiving sheets at which the tabs should be mounted on sheets of different lengths to assure a neat and uniformly spaced index.

In the preferred embodiment, this scale means comprises a transversely extending center line and marginally located indicia uniformly spaced in both directions therefrom with the distance between adjacent indicia being at least slightly less than the width of the particular tabs in the set to insure their legibility when applied as a set in accordance with the scale means. The latter also includes secondary marginal indices aligned longitudinally of the release paper with the indicia to indicate various lengths of receiving sheets to which the index tabs may be applied by use of those indicia. In order to similarly apply the set of index tabs to longer receiving sheets, additional secondary marginal indices are aligned therewith to designate the longer lengths of receiving sheets with which such additional scale means may selectively be employed.

Since it is not convenient to employ these novel scale means directly with the volume of tab-receiving sheets, because the same are on the reverse side of the release paper carrier strip and would require applying guideline marks to the sheets, this invention includes a novel method of applying a set of index tabs which comprises folding in half lengthwise a strip having the same length as the tab-receiving edges of the sheets to present the resulting fold line as a locating index, placing that strip adjacent the proper marginal indicia on the release paper backing as indicated by the secondary marginal indices and with that locating index aligned with the transverse center line of the backing, inscribing tab-locating marks on the strip coinciding transversely with the selected scale indicia, and placing the inscribed strip adjacent and longitudinally aligned with the tab-receiving sheet edges to indicate by means of the marks the proper positions for applying the index tabs to selected sheets.

IN THE DRAWINGS

FIG. 1 is a plan view of an alphabetical set of precut index tabs mounted on a release paper carrier strip;

FIG. 2 is a bottom plan view of the set of FIG. 1 showing the scale means on the reverse side of the release paper carrier;

FIG. 3 is a plan view of a part of a position layout strip showing the fold line locating index and tab-locating marks inscribed thereon; and FIG. 4 is an enlarged transverse sectional view as taken on the line 4—4 of FIG. 2.

DESCRIPTION OF PREFERRED EMBODIMENT

Referring particularly to FIGS. 1 and 4, reference numeral 11 indicates in general a composite strip of precut index tabs comprising a release paper carrier strip 12 and a plurality of separate index tabs 13 mounted on the obverse side thereof. Each tab 13 preferably is made up of a base member or backing 14 of a transparent polyester film, such as that marketed under the trademark "MYLAR," which is provided on its under or reverse surface (the top surface in FIG. 4) with a suitable coating of clear pressure-sensitive adhesive, and a pair of filler members 15 disposed below and secured to that adhesive surface of the base member 14. The base member or backing 14 extends transversely beyond the filler members 15 to provide skirt or wing portions 16 which are temporarily adhered to the obverse surface of the carrier 12 that is impregnated in well-known manner with a suitable polyethylene.

As best seen in FIG. 1, these index tabs may be formed by successively overlaying the release paper carrier strip 12 with parallel strips to form the filler members 15 and an elongated strip to form the base member 14 and then die-cutting through the latter and the filler members 15 down to, but not through, the carrier 12 on transverse lines 17. The desired indicia 18 preferably are inscribed upon the upper surfaces of the filler strips before such assembly, with those on transversely adjacent filler members 15 being offset longitudinally of the carrier strip to facilitate reading when the tabs 13 are removed from the carrier 12 and applied to the marginal edges of selected sheets of a volume to present a complete index in the manner hereinafter described.

It will be understood that such pressure-responsive index tabs 13 with their skirt portions 16 having the pressure-sensitive adhesive on their under surfaces exposed when removed from the release paper carrier strip 12 are applied to the selected tab-receiving sheets by first pressing one of the skirt portions 16 against the obverse surface of a marginal edge of the sheet, and then folding the tab along a hinge portion separating the filler members 15 and pressing the other skirt portion 16 against the reverse surface of the receiving sheet. This manner of attaching the index tabs to the receiving sheets is well known and is described in my prior U.S. Pat. No. 3,070,482. But, as previously noted herein, this does not assure proper location of the tabs 13 to result in a neat index having the tabs uniformly spaced from each other.

To facilitate this very desirable end result, novel scale means indicated generally by reference numerals 19 and 21, a transversely extending center line index 22, and secondary indices 23 and 24 associated, respectively, and forming a part of the scale means 19 and 21 are inscribed upon or otherwise secured to the reverse side of the release paper carrier strip 12 (FIG. 2) or a liner strip 25 (FIG. 4) secured thereto by any suitable adhesive. The scale means 19 and 21 are disposed, respectively, along the longitudinal margins of the release paper carrier strip 12. The scale means 19 includes indicia 26 which are the same as indicia 18 on the set of index tabs 13 on the obverse side of carrier 12 and are uniformly spaced successively in both directions from the transverse center line 22, except for the UV and XYZ indices, along with arrows 27, one of which is disposed below each of the indicia 26 and will be used to indicate the proper positioning of the bottom edge of the corresponding index tab 13 in a manner to be described hereinafter. The distance between adjacent indicia 26 and their associated arrows 27 is at least only slightly less than the width of the tabs 13 as defined by the transverse severance lines 17 of FIG. 1. Thus, while adjacent index tabs 13 will overlap when applied to tab-receiving sheets to form a complete index, the indicia 18 on both sides thereof will be clearly legible.

The secondary indices 23 which also form a part of the scale means 19 are marginally disposed and aligned longitudinally of the carrier strip 12 with the indicia 26,27 and indicate various lengths of tab-receiving sheets to which the index tabs 13 may be accurately applied in accordance with the scale means 19 according to the method later to be described.

It will be noted from FIG. 2 that the additional scale means 21 is marginally disposed relative to the release strip 12 opposite the scale means 19 and, like the latter, comprises indicia 28, which are the same as indicia 18 and 26, and arrows 29 which are the same as arrows 27, except that the indicia 28,29 are upside down compared to indicia 26,27 and are spaced from adjacent indicia at a greater distance than that separating adjacent indicia 26,27. In using this scale means 21, the release strip 12 merely is turned in its own plane through 180° from its position of FIG. 2. This will display the indicia 28 right-side-up, and the secondary indices 24 which indicate various lengths of tab-receiving sheets to which the index tabs 13 may be applied in accordance with scale means 21 will be aligned with and above the second set of indicia 28,29.

It will be appreciated that the spacing between adjacent indicia 26,27 and 28,29 will be dependent upon and relate both to the width of the precut index tabs 13, as defined by adjacent severance lines 17, and the lengths of the tab-receiving sheets to which the index is to be applied, the latter being designated with respect to the scales 19 and 21 by the secondary indices 23 and 24, respectively. It also will be appreciated that while the illustrated embodiment comprises an alphabetical index, the invention is equally adaptable for use with any other desired index, such as numerical, monthly, zip-coded states, and the like.

The method for applying a set of precut index tabs to the marginal edges of selected sheets of a volume of such sheets comprises folding in half lengthwise a strip, as that designated by reference numeral 31 in FIG. 3, having the same length as the marginal tab-receiving edges of those sheets, and then unfolding that auxiliary strip 31 to present the resulting fold line as a locating index 32. That auxiliary strip 31 is then placed adjacent the appropriate scale 19 or 21 with the locating index 32 laterally aligned with the transverse center line 22 of the release paper carrier strip 12. Tab-locating marks 33 are then made on the edge portion of the auxiliary strip 31 coinciding with the arrows 27 or 29 and indicia 34 inscribed on strip 31 corresponding to the adjacent indicia 26 or 28 of the selected scale 19 or 21. It will be appreciated that the resulting scale indicia or tab-locating marks 33,34 will total in each direction from the center line 22 and the locating index 32 one-half the number of index tabs 13 to be applied. As a reference check, the upper edge of the auxiliary strip 31 will be transversely aligned with the secondary index 23 or 24 corresponding to the length of the tab-receiving sheets. The thus inscribed auxiliary strip 31 then is placed adjacent and longitudinally aligned with the tab-receiving sheet edges of a volume to be indexed to indicate by means of the marks 33,34 the proper positions for applying the several index tabs 13 of the precut set to selected sheets to present an index comprising individual tabs accurately uniformly arranged lengthwise of the receiving volume in both directions from its transverse center.

It is thought that this invention and many of its attendant advantages will be understood from the foregoing description, and it will be apparent that various changes may be made in the form, construction, and arrangement of the parts, and the specific steps of the method, without departing from the spirit and scope of the invention or sacrificing all of its material advantages, the form and steps hereinbefore described merely being preferred embodiments thereof.

I claim:

1. A composite strip of precut index tabs each having wing portions with pressure-sensitive adhesive on their under surfaces removably adhered to the obverse side of a release paper carrier strip, and scale means on the reverse side of said carrier strip comprising a transversely extending center line at the longitudinal center of said carrier strip and a first set of indicia spaced successively in both directions from said center line along one margin of said carrier strip, with the distance between adjacent said indicia being at least slightly less than the width of said tabs, whereby the latter are legible when properly applied as a set to selected sheets of a volume of sheets.

2. In a composite strip according to claim 1, secondary marginal indices comprising part of said scale means aligned longitudinally of said carrier strip with said indicia corresponding to first various lengths of receiving sheets to which said index tabs may be applied.

3. In a composite strip according to claim 2, additional scale means on the reverse side of said carrier strip comprising a second set of indicia spaced from each other in both directions from said center line along the other margin of said carrier strip with the distance therebetween being greater than that separating said first marginally located indicia, and additional secondary marginal indices aligned marginally of said carrier strip with said second set of indicia corresponding to various lengths of receiving sheets longer than said first lengths of receiving sheets to which said index tabs may be applied.

4. An index tab position layout for use with a set of index tabs having pressure-sensitive adhesive portions mounted on a release surface on the obverse side of an elongated backing strip, comprising on the reverse side of said backing strip:
1. a transverse center line index; and
2. tab indices longitudinally spaced along one marginal portion in opposite directions from said center line index, each comprising
 a. a specific identification of one of said set of index tabs, and
 b. a mark corresponding to the position at which the bottom edge of that one of said index tabs should be placed when being properly applied to a selected sheet of a volume of sheets.

5. In an index tab position layout according to claim 4, secondary marginal indices on the reverse side of said carrier strip aligned longitudinally thereof with said tab indices corresponding to first various lengths of receiving sheets to which said index tabs may be applied.

6. In an index tab position layout according to claim 5, a second set of indicia spaced from each other in both directions from said center line along the other margin of the reverse side of said carrier strip, and additional secondary marginal indices aligned with said second set of indicia corresponding to various lengths of receiving sheets other than said first lengths of receiving sheets to which said index tabs may be applied.

7. The method of applying a set of index tabs to the marginal edges of selected sheets of a volume of said sheets, comprising transversely folding in half lengthwise an auxiliary strip having the same length as the marginal tab-receiving edges of said sheets and then unfolding said auxiliary strip to present the resulting fold line as a locating index, placing said auxiliary strip adjacent a scale made up of indicia spaced successively in both directions from an indicated transverse center line with said locating index aligned with said transverse center line, inscribing tab-locating marks transversely on said auxiliary strip coinciding with said scale indicia, and placing said inscribed auxiliary strip adjacent and longitudinally aligned with said tab-receiving sheet edges to indicate by means of said marks the proper positions for applying index tabs to selected said sheets to present an index comprising individual tabs accurately arranged lengthwise of said volume in both directions from the transverse center thereof.

* * * * *